United States Patent [19]
Marron et al.

[11] Patent Number: 5,926,277
[45] Date of Patent: Jul. 20, 1999

[54] METHOD AND APPARATUS FOR THREE-DIMENSIONAL IMAGING USING LASER ILLUMINATION INTERFEROMETRY

[75] Inventors: Joseph C. Marron, Ann Arbor; Kurt W. Gleichman, Saline, both of Mich.

[73] Assignee: Erim International, Inc., Ann Arbor, Mich.

[21] Appl. No.: 09/199,629

[22] Filed: Nov. 25, 1998

Related U.S. Application Data

[62] Division of application No. 08/925,377, Sep. 8, 1987.

[51] Int. Cl.$^6$ .................................................. G01B 9/02
[52] U.S. Cl. ........................................ 356/360; 356/359
[58] Field of Search .................................. 356/345, 359, 356/360, 346

[56] References Cited

U.S. PATENT DOCUMENTS

| | | | |
|---|---|---|---|
| 4,387,994 | 6/1983 | Balasubramanian | 356/360 |
| 5,777,742 | 7/1998 | Marron | 356/360 |

*Primary Examiner*—Robert H. Kim
*Attorney, Agent, or Firm*—Brooks & Kushman PC

[57] ABSTRACT

A method for determining a range dimension of an object utilizing multiple wavelength interferometry to form an image of the object includes developing a discernible two-dimensional image from an interference pattern at selected points for each of a number of wavelengths, collecting complex values from the interference pattern and developing a phase value from the complex value, and determining a phase correction vector based on a difference between measured phase values and an ideal phase value associated with one or more reference points. The phase correction vector is used to correct each of the selected points. A one-dimensional Fourier transform is performed on the corrected values to yield a range profile for each selected point. A peak value is then determined from the range profile to determine the range dimension. The peak value may be determined based on a simple maximum, oversampling in selected areas prior to performing the Fourier transform, or using curve-fitting techniques. The phase correction vector minimizes phase errors due to various causes such as insufficient knowledge of the laser frequencies, or which occur when optical path lengths of the object and reference beams are not match, to provide a computationally efficient method of improving accuracy in the range dimension.

12 Claims, 4 Drawing Sheets

METHOD AND APPARATUS FOR THREE-DIMENSIONAL IMAGING USING LASER ILLUMINATION INTERFEROMETRY

CROSS REFERENCE TO RELATED APPLICATION

This application is a divisional patent application of U.S. Ser. No. 08/925,377 which was filed Sep. 8, 1997.

FIELD OF THE INVENTION

The present invention relates to a system and method for determining the range (or depth) profile of a three-dimensional image of an object, including a system and method for automatically correcting phase errors encountered in three-dimensional imaging systems that use laser illumination with interferometric detection to perform precision 3-D imaging.

BACKGROUND ART

Figure 1:
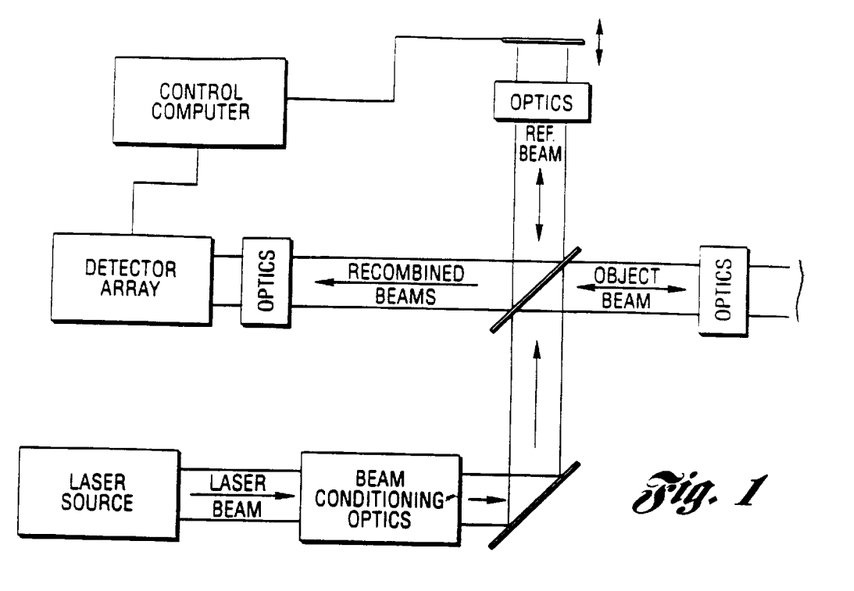
FIG. 1 is a diagram illustrating the basic components of a laser interferometer.

Interferometric imaging systems based on laser illumination of an object (employing an optical system of the type depicted in FIG. 1) are well known to provide three-dimensional information about the object being inspected. Two existing methods utilize single wavelength laser interferometry and two wavelength laser interferometry.

Single wavelength interferometry records an interferogram of the surface of an object being inspected. A measure of the height difference (hereinafter also referred to as the range or depth) of points on the object from a flat reference surface may be ascertained in the single wavelength system by calculating the difference in path lengths at each point between the object and reference beams. However, the phase measured by the system is a modulo $2\pi$ quantity and thus gives rise to an ambiguity whereby the same phase value $\phi$ results for pixels that have distance values that differ by integral numbers of wavelengths. While spatial unwrapping algorithms have been used to determine the depth profiles of smooth objects, this method is ineffective for surfaces that have height steps that are larger than one wavelength.

Two-wavelength interferometry has been proposed to extend the range ambiguity interval. U.S. Pat. No. 4,832,489, issued to Wyant and Creath, discloses a method of recovering the optical path difference from the phase difference for two images collected at two wavelengths. Specifically, Wyant and Creath discloses defining a phase difference quantity $$\Phi_{eq} = \phi_1 - \phi_2 \quad (1)$$

Where $\phi_1$ and $\phi_2$ are the interferometric images recorded at wavelengths $\lambda_1$ and $\lambda_2$ respectively. The optical path difference is then found via $$D_{obj} - D_{ref} = \frac{\Phi_{eq}}{2\pi} \lambda_{eq} \quad (2)$$

where $$D_{obj} - D_{ref} = \frac{\Phi_{eq}}{2\pi} \lambda_{eq} \quad (3)$$

The ambiguity interval for this imaging method is $\lambda_{eq}$.

With this two wavelength method, the ambiguity level varies inversely with the wavelength separation. For large range ambiguity, one would typically employ closely spaced wavelengths in this system. However, this reduces range resolution, which can only be increased in the two wavelength regime by broadly spacing the wavelengths.

Thus, while single and two-wavelength interferometric imaging methods may be utilized to measure the profiles of relatively smooth objects such as optical components, these methods have limitations which prevent inspection of objects with a wide variety of surface reflectivity, as well as inspecting objects with large depth extents at fine resolution.

These inventors have proposed the use of multi-wavelength (i.e. greater than two wavelength) laser illumination interferometry which overcomes the limitations of the above-described methods by employing greater than two wavelengths, with some closely spaced to provide a large ambiguity level, and with the spacing of the extreme wavelengths of the series large enough to give fine resolution.

One problem encountered with performing three-dimensional interferometric imaging using these laser illumination techniques is phase errors which may result from insufficient knowledge of the laser frequency values, differences in material dispersion properties caused by differences in the number and types of optical components in the paths of the object and reference beams, and relative motion (drift) between the object and reference beams during the data collection time interval. Left uncorrected, these phase errors may result in an aberrated range profile, thereby impairing the ability to determine the location of the peak of the range profile, thus adversely affecting range (or depth) resolution accuracy. Methods for limiting the effect of these phase errors include the use of an optical system which is adjunct to the three-dimensional imaging system to explicitly measure the laser frequencies, use of imaging system configurations in which the path lengths of the object and reference beams are matched (such as when there are differences in the material dispersion properties for the object and reference beam paths), and attempting to maintain mechanical rigidity over the data collection time interval. These solutions, generally directed to the increased stabilization of the optical system to limit the phase errors, are typically costly and cumbersome since they require additional hardware components and/or impose additional constraints on the mechanical configuration which may limit the capabilities of the system.

SUMMARY OF THE INVENTION

It is therefore an object of the present invention to provide a method and system for forming a three-dimensional image of an object utilizing laser illumination wavelength interferometry wherein the range dimension of the image is determined in an accurate, precise and computationally efficient manner.

It is another object of the present invention to provide a method and system for obtaining a depth profile for an object utilizing laser illumination wavelength interferometry wherein the range dimension of the image is determined in an accurate, precise and computationally efficient manner.

It is another object of the present invention to provide a system and method for determining the range dimension of a three-dimensional image in a laser illumination interferometric imaging system which minimizes the phase errors due to insufficient knowledge of the laser frequencies.

It is yet another object of the present invention to provide a system and method for determining the range dimension of a three-dimensional image in a laser illumination interferometric imaging system which minimizes the phase errors which occur when the path lengths of the object and reference beams are not matched.

It is yet another object of the present invention to provide a system and method for determining the range dimension of a three-dimensional image in a laser illumination interferometric imaging system which minimizes the phase errors due to relative motion (drift) between the object and reference beams during the data collection time interval.

In carrying out the above objects and other objects and features of the present invention, a method and apparatus are provided for forming a three-dimensional image of an object. A method for determining the range dimension of the three-dimensional image includes the steps of developing a two-dimensional representation of the image of the object from an interference pattern for each of a plurality of wavelengths at each of a plurality of selected points on the object, developing a complex value associated with the interference pattern for each of a plurality of wavelengths at each of a plurality of selected points on the object, performing a one-dimensional Fourier transform on a series of the complex values for each of the selected points to yield a range profile for each selected point, and determining the peak value from each of the range profiles, representative of the range dimension at that point.

The peak values may also then be combined with the two-dimensional image information to construct a three-dimensional image of the object.

The two-dimensional representation of the image is obtained by transforming the interference pattern by performing a two-dimensional Fourier transform to produce a discernible image. This step is preferably accomplished with a lens (thereby producing an image recognizable as a likeness of the object) which focuses the interference pattern on a two-dimensional detector array positioned in the image plane of the lens.

The peak value may be determined using conventional curve fitting techniques and/or by oversampling the Fourier transform in the range domain and selecting the peak value of the range image.

A system and method for phase correction are also provided wherein at least one reference point is selected on the object, and determining the difference between the phase value and an associated ideal phase value for each of the wavelengths at that reference point. A phase correction vector is established from this difference and the phase correction vector is added to each of the selected points to obtain a corrected value for each of the selected points prior to performing the Fourier transform of the selected points to yield a corrected range profile, providing accurate and precise determination of the height of imaged objects.

In one embodiment, multiple reference points are selected with each of the multiple reference points, for example, associated with different regions of the object image. Thus, if the object includes valley and plateau regions, separate reference points associated with each of these regions may be utilized.

Alternatively, or in addition, the phase correction of the present invention may be employed on one or more subsets of selected points in the image to achieve high resolution in that region and/or to decrease the computational load associated with generating the desired range information.

The multiple (i.e. greater than two) wavelength embodiment of the system and method of the present invention thus provides the capability of measuring objects with surface reflectivities that are specular and/or diffuse, since accurate, unambiguous range information is developed from information collected at only one pixel, whereas other methods can require spatial unwrapping of fringes to obtain three-dimensional information. It should further be appreciated that, by distributing the energy over a series of measurements, multiple wavelength methods have inherently high dynamic-range and can thus form images that contain combinations of strong specular and weak diffuse returns.

Furthermore, since multiple wavelength methods determine depth by using a multiplicity of interferometric measurements, more precise results are obtained than can be obtained with methods using one or two wavelengths. And, the methods are more tolerant of erroneous data, since the effect of an isolated degraded measurement is compensated by the multiplicity of similar measurements.

It should also be appreciated that the phase error correction capability of the present invention allows for more accurate and precise collection of three-dimensional images, despite the presence of conditions which otherwise give rise to phase error, without the use of adjunct optical systems, more complex imaging system configurations (to ensure matching of the path lengths of the object and reference beams), or other mechanical vibrational or thermal system stabilization equipment.

It should also be appreciated that, although the phase error correction capability of the present invention is preferably utilized in a multiple wavelength interferometric system, the phase correction of the present invention may be utilized in any laser illumination interferometry imaging systems to reduce or eliminate phase error.

The above objects, features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 2:
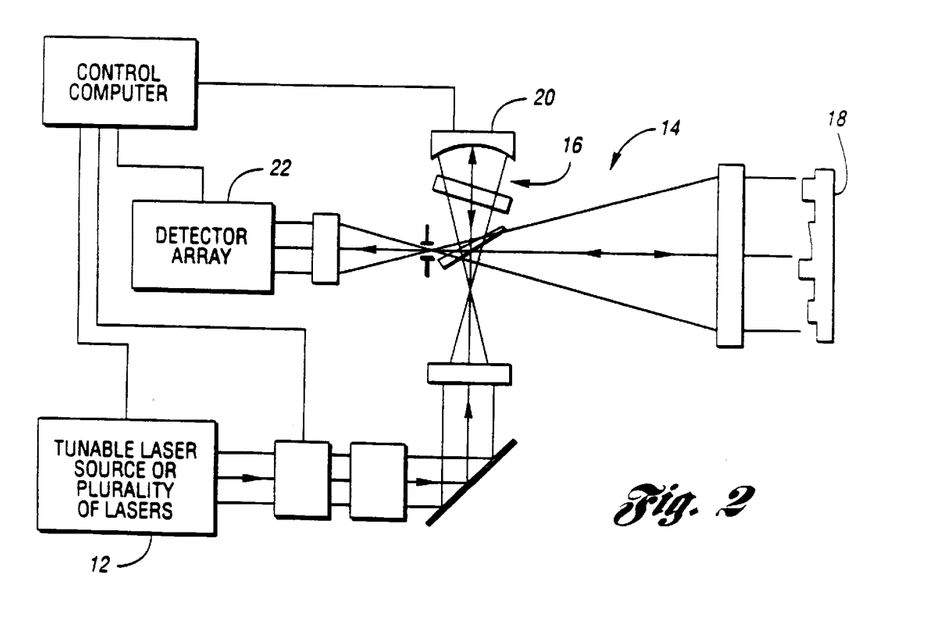
FIG. 2 is a simplified hardware diagram illustrating an apparatus in which the system and method of the present invention may be employed.

Referring now to FIG. 2, a schematic representation of one embodiment of a three-dimensional optical imaging system which may include the method and apparatus of the present invention is shown. Light from a tunable laser 12 is split into object and reference beams, 14 and 16, respectively. The object beam 14 reflects from an object 18 and travels back into the optical system. The reference beam 16 is reflected by a reference mirror 20 and travels back into the optical system as well. Light from the two beams interferes, and the interference pattern is recorded by detector array 22. Lenses in the system are arranged so that the object is imaged onto the detector array. Phase shifting is used to record the complex-valued interference image. This is preferably accomplished by moving the reference mirror with a piezoelectric actuator (not shown). The phase of the interference image contains information about the profile (also referred to as range or depth) of the object 18 being inspected. Systems of this type may be used to perform single wavelength interferometry, two wavelength interferometry, or multi-wavelength (i.e., more than two wavelengths) interferometry from which three-dimensional images may be developed.

The system and method of the present invention are preferably employed in a multi-wavelength interferometric imaging system such as the type described in U.S. Pat. No. 5,777,742, titled "SYSTEM AND METHOD FOR THREE-DIMENSIONAL IMAGING", the disclosure of which is hereby incorporated by reference herein in its entirety. The system and method of the present invention is most preferably incorporated in a multi-wavelength imaging system of the type disclosed in copending application U.S. Ser. No. 08/925,381, filed concurrently herewith, titled "MULTIPLE WAVELENGTH IMAGE PLANE INTERFEROMETRY", the disclosure of which application is also incorporated herein by reference in its entirety.

Figure 3:
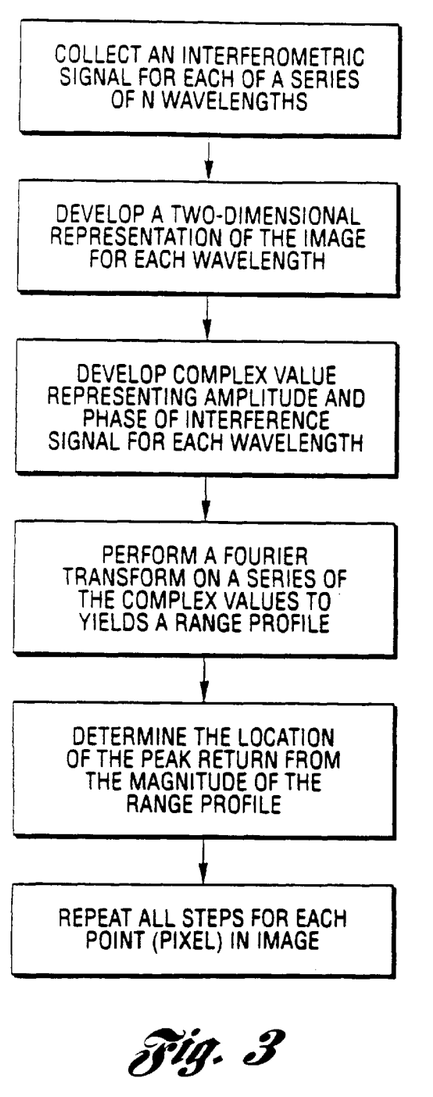
FIG. 3 is a flow diagram illustrating the basic method of the present invention.

Referring now to FIG. 3, the basic method of the present invention utilizes Fourier transform processing to develop a range profile from which a range peak, and, thus, a specific range value for each pixel, may be determined. The basic method includes:

(a) collecting an interferometric image, and developing a two-dimensional representation of the image, for each of the series of N laser wavelengths. In the preferred embodiments, the two-dimensional representation is a produced by performing a two-dimensional Fourier transform on the interference pattern, most preferably produced by a lens, to produce a discernable image recognizable as a likeness of the object. The optical configurations preferably employed are of the type disclosed in the above-mentioned U.S. Pat. No. 5,777,742, or, most preferably, of the type described in the above-mentioned application Ser. No. 08/925,381, filed concurrently herewith. However, it should be appreciated that other system configurations may be employed without departing from the spirit of the present invention.

(b) Developing a complex value representing the amplitude and phase of the interference signal from the two-dimensional representation of the image for each wavelength. The value of the complex number for the $n^{th}$ wavelength is given by $$D_{obj} - D_{ref} = \frac{\Phi_{eq}}{2\pi}\lambda_{eq} \qquad (4)$$

where $A_n$ is the amplitude, $\phi_n$ is the phase for a specific pixel at the $n^{th}$ wavelength, $\lambda_n$ is the $n^{th}$ wavelength, $D_{obj}$ is the optical path length of the light beam that illuminates a point on the object, and $D_{ref}$ is the optical path length for the corresponding point in the reference beam.

(c) Once the complex values relating images for entire series of laser frequencies (wavelengths) are collected, compute the Fourier transform of the data on a pixel-by-pixel basis. The Fourier transform relationship is given in discrete form by $$f(x) = \sum_{n=1}^{N} A_n e^{-i\phi_n} e^{i\frac{2\pi}{c}\nu_n x} \qquad (5)$$

where we have substituted $\lambda_n = c/\nu_n$. This Fourier transform over the N laser frequencies is computed for each pixel of the detector array. In computing this Fourier transform, sampling issues are important. For example, the Fourier transform need only be computed over an interval that covers one range ambiguity interval:

$$\Delta x_{n_{amb}} = c/(2(\nu_n - \nu_{n-1})) \qquad (6)$$

Also, to critically sample the data in the range domain, it is only necessary to compute the Fourier transform over N range samples, where N is the number of laser frequencies. In some cases it is useful to set the amplitude values, $A_n$, to a constant value for all laser frequencies. It will be appreciated that setting the amplitude values to a constant is particularly useful when the laser power varies as a function of the wavelength, since such variation can degrade the shape of the impulse response function.

Figure 4:
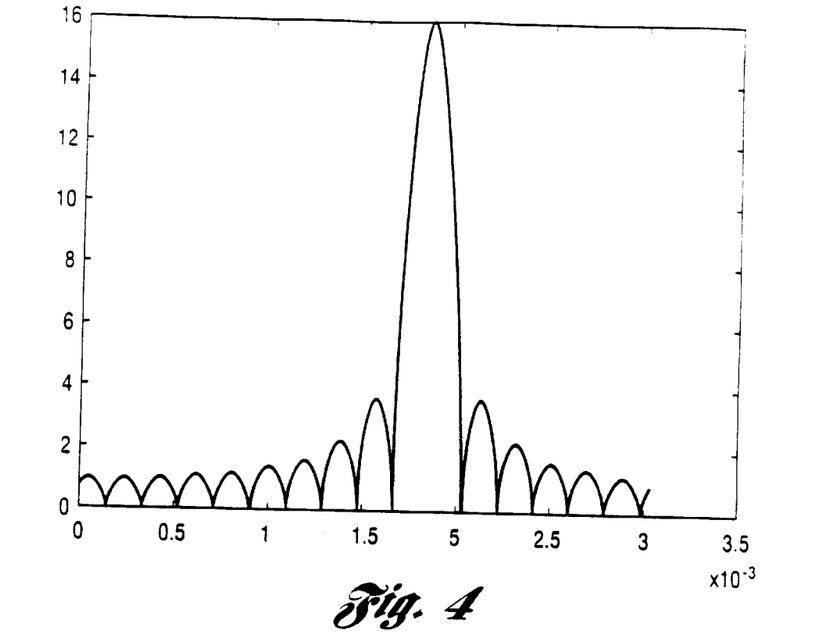
FIG. 4 is a graph illustrating an example ideal range profile obtained by Fourier transformation of the interferometric image values.

After computation of the Fourier transform, the magnitude of the Fourier transform is taken. An example of the Fourier magnitude obtained using N=16 laser frequencies is shown in FIG. 4. In this embodiment the number of laser frequencies, N, was chosen as 16. This value was empirically chosen, based upon various system design and operation considerations, including image accuracy, repeatability, and minimizing data collection time. However, it will be appreciated that other values of N may be appropriate, depending upon the above considerations, as well as the characteristics of the object being inspected, and the capabilities of the laser and associated optical components of the system.

Figure 5:
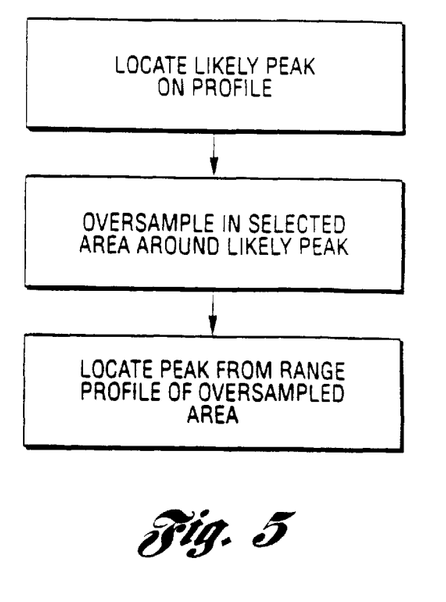
FIG. 5 is a flow diagram illustrating the oversampling technique that may be employed to find the peak value in the range profile.

(d) From the magnitude of the range profile, the location of the peak return is found. Approaches for accomplishing this include using a curve fitting routine (such as quadratic or spline) to fit the data points near the peak of the range profile, then solving for the location of the peak of the fitted curve. Another approach (as shown in FIG. 5 and described in greater detail hereafter) is to quickly locate the likely peak (such as by maximization), oversample the Fourier transform in the range domain in the area of the likely peak, and then again find the peak value (again by maximization) of the oversampled range image. By using either of these approaches it is possible to determine the peak of the range profile very accurately. For the 16 wavelength case, the peak of the main lobe may be located with accuracies of better than $1/100^{th}$ of the lobe width.

Though, as previously described, a variety of methods may be utilized to locate the peak return from the magnitude of the range profile, a preferred approach is to oversample the Fourier transform in the range domain in the area of the likely peak. A simple implementation of this method is illustrated in FIG. 5. After the range profile is obtained, a simple method, such as by maximizing the profile, is utilized to quickly locate the likely peak. The Fourier transform is then oversampled (i.e., additional data points are included in the area of the likely peak) to yield an improved range profile. This is preferably accomplished by selecting the additional data points, then performing a discrete Fourier transform using the selected points in the area of the likely peak. The location of the peak return is then found from the magnitude of the improved range profile. Again, this can be accomplished by using curve fitting routines or by maximization. The resulting peak represents the range value at that point.

While the preferred method employs discrete Fourier transformation where required, other methods, including fast Fourier transform, may alternatively or also be employed as desired without departing from the spirit of the invention.

Figure 6:
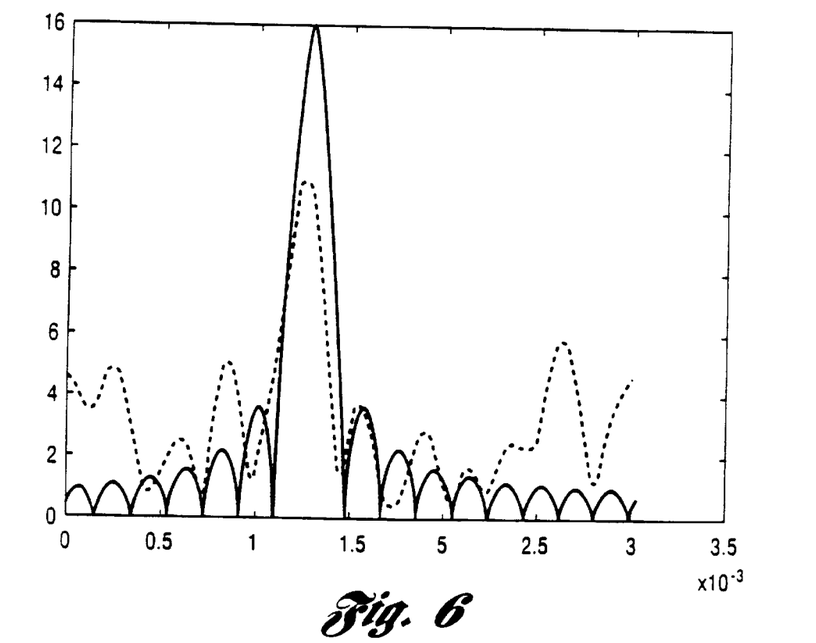
FIG. 6 is an example of a range profile obtained with inaccuracy in the knowledge of the laser frequencies utilized and the corrected profile obtained using the phase correction of the present invention.

If conditions exist which might introduce phase error, such as, for example, if the laser frequencies are not accurately known, the range profile is aberrated and the ability to determine the location of the peak of the range profile is degraded. The dashed lines in FIG. 6 show an example of the range profile obtained with inaccurate knowledge of the laser frequencies.

The amount of phase aberration produced by inaccurate knowledge of the frequencies is given by $$\Delta\phi = -2\pi(D_{obj} - D_{ref})(\Delta\lambda)/\lambda^2 \quad (7)$$

where $\Delta\lambda$ is the inaccuracy in laser wavelength knowledge. If we allow $\pi/4$ phase error for each laser frequency, the required knowledge of laser frequency is $$\Delta\lambda = \lambda^2/(4(D_{obj} - D_{ref})) \quad (8)$$

With $\lambda = 0.85$ $\mu$m and the optical path difference equal to 1 cm, the required wavelength precision is $\Delta\lambda = 0.018$ nm. In other words, given a laser system for which the laser can be tuned with accuracy of $\Delta\lambda - 0.018$ nm, the system could obtain accurate range values for parts for which: 1) the paths are nominally matched in length and 2) the range differences within the part do not exceed +/−1 cm.

However, for some applications it is difficult to satisfy Eq. 7. Such applications arise if the laser wavelength is not accurately known, the paths of the object and reference beams can not be matched in length, or, for the above example, the depth of the object exceeds +/−1 cm. In such cases, one would conventionally be driven to increase the system hardware complexity to meet the requirements. For example one could augment the system with an auxiliary wavelength measuring system. This however adds cost and makes the system more complex.

Also, it is sometimes difficult to match the amount of dispersion in the object and reference beam paths. If there are differences in the dispersion, erroneous measurements of object depth can result. Furthermore, phase errors can result from other sources, such as mechanical motion, also contributing to degradation of the depth measurements.

Figure 7:
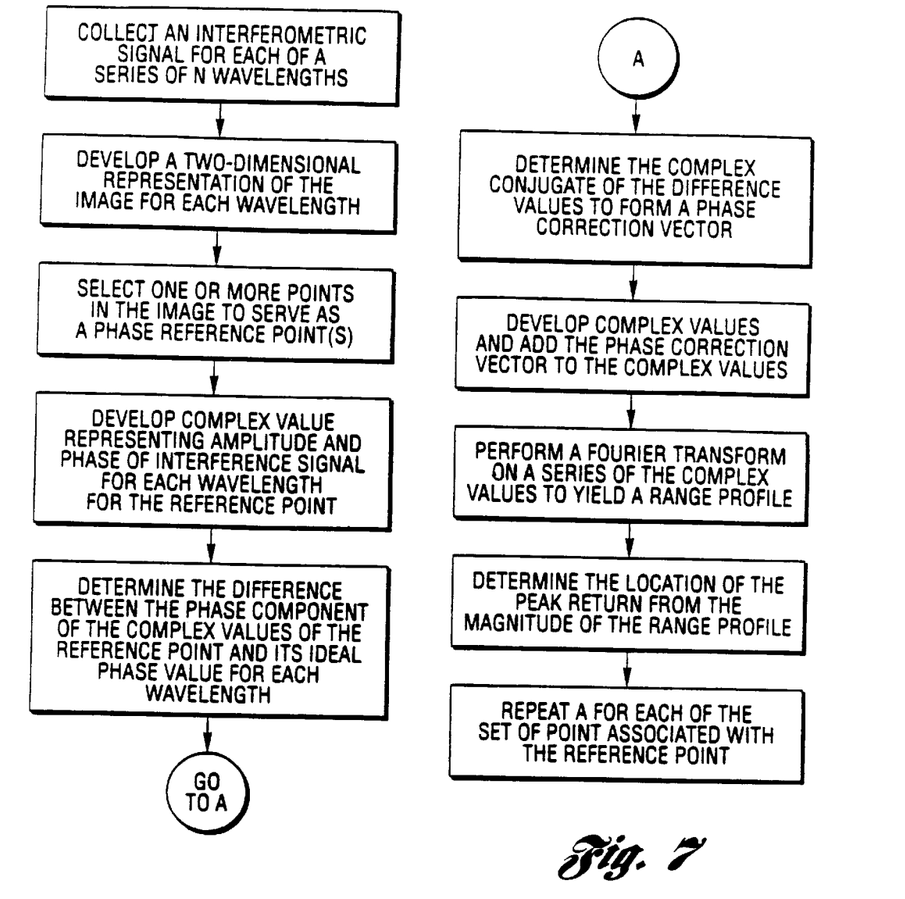
FIG. 7 is a flow diagram of the method of the present invention including phase error correction.

One embodiment of the present invention employs a system and method for phase correction which allows recovery of accurate range information, and construction of three-dimensional images, despite limited accuracy of laser wavelength knowledge and/or without requiring matching of the pathlengths of the object and reference beams. Referring to FIG. 7, the basic steps in the improved image formation with phase correction are:

a) Collect an interferometric image for each of a series of N laser wavelengths.

b) Select a point (or points) in the image to serve as a phase reference point. As described hereinafter in greater detail, the reference point is preferably selected from the initially selected reference point or a point in the neighborhood of the reference point exhibiting good phase information. In general, the reference point is preferably selected in the region known to have a relatively flat surface.

c) Determine the difference between the phase values of each reference point and an associated ideal phase value.

The phase difference is computed for each wavelength and the complex conjugate of this phase value difference forms a phase correction vector.

d) Establish a corrected value for a selected set of points associated with the reference point by adding the phase correction vector to the complex values of each of the points in the set.

e) Compute the Fourier transform of these adjusted complex values, and f) Find the peak in the range profiles for each point.

The ideal phase values are preferably zero or constant. For example, by selecting the ideal phase value as zero (i.e., the ideal phasor values set for each of the N wavelengths for a particular point equal to $e^{i0}{}_2, e^{i0}{}_2, e^{i0}{}_1 \ldots e^{i0}{}_N$), will result in the associated reference point being located at a depth of zero when the phase correction vector is applied to the reference point.

In summary, the phase correction method is similar to the previously described method of FIG. 3, except that a phase correction vector is applied to each pixel. This phase correction vector serves not only to correct for phase errors caused by inaccurate knowledge of the laser frequencies, but it also corrects for phase errors induced by mechanical drift or component dispersion. As a result, the range depth of the object is limited to $$xx = \pm\lambda^2/(4\Delta\lambda) \quad (9)$$

Note that this equation is similar to Eq. 7—above. As an example, consider a tunable diode laser that provides the value of the wavelength with an accuracy of +/−0.005 nm with a nominal operating wavelength of 850 nm. For this case $\Delta x = +/-3.6$ cm. Thus, the new algorithm allows the system to make precise measurements of object range without augmentation of the laser's internal wavelength measuring system, and also without the pathlengths of the interferometer being matched. In addition, the phase correction vector automatically corrects for phase errors caused by long term drift.

Figure 8:
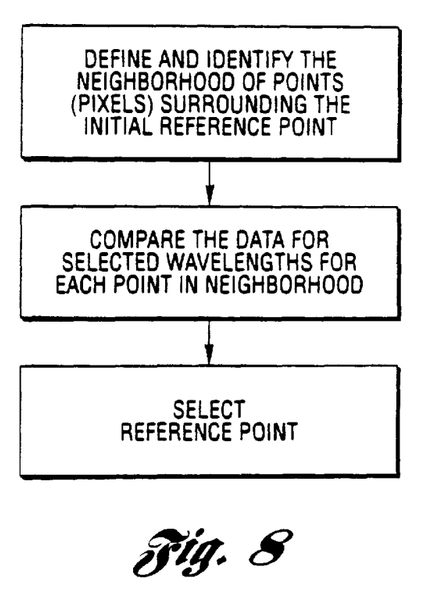
FIG. 8 is a flow diagram illustrating the neighborhood technique that may be employed to find the ideal points utilized in the phase error correction.

The reference points are typically initially selected because they are located at or near fiducials or other areas of interest on the object. However, it is desirable to select a reference point having relatively complete and reliable data since the correction vector is to be calculated from reference point data. Referring now to FIG. 8, one simple method for selecting the best reference point(s) is to initially select a reference point, such as by observation, then identify a neighborhood of points (or pixels) surrounding (and including) the initially selected reference point. In one embodiment, the eight pixels surrounding the selected reference point, which together with the reference point, form a 3×3 array comprise the neighborhood. The data for each of the N wavelengths is then examined for each of the eight pixels. In one embodiment of the invention the point in the neighborhood with the largest amplitude, and which does not include any saturated digital signal data values, is then selected from the nine pixels, and the process is repeated for each of the selected reference points.

Figure 9:
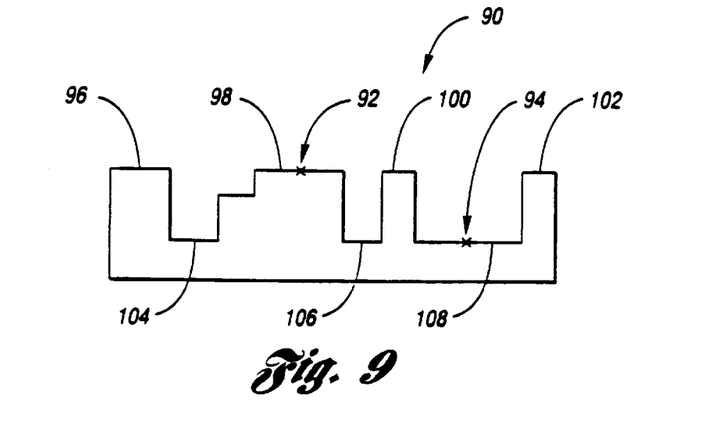
FIG. 9 is a schematic illustration of the use of multiple reference points in selected areas of the object.

FIG. 9 illustrates one practical use of selecting multiple reference points when the present invention is utilized to inspect parts. An exemplary part 90 is shown as having surfaces of interest on several planes. A first reference point 92 is selected on the top surface of the part. The phase correction of the present invention can be applied to the set of all of the points in the plane of reference point 92, including all the points on the surfaces 96, 98, 100 and 102. A second reference point 94 is also selected. A separate phase correction can be applied to a selected set of points at or near the depth of the plane of the surface 108 including point 94. This set could also include points on the surfaces 104 and 106. It will be appreciated that other reference points may be selected, and phase correction implemented for sets of points associated with those other reference points, depending upon the part design and desired results. It will also be appreciated that phase correction need not be applied to all of the points on the part surface (i.e., phase correction may be applied only to selected subsets of the entirety of the points on the image) in order to minimize computation time.

As an example, the solid lines of FIG. 6 show a range profile for a specific pixel obtained by using the improved phase correction method. Note that with the improved method, precise measurements of the pixel range can readily be obtained. Also note that the residual error in the range profile is caused by system noise that is not common between the reference pixel and the corrected pixels. Such noise can arise from sources such as electronic noise.

As will be appreciated by one of ordinary skill in the art, the method and system of the present invention may be implemented or effected in hardware, software, or a combination of hardware and software. The various functions are preferably effected by a programmed microprocessor, and most preferably by a desktop personal computer. In one embodiment, a desktop computer including a 200 MHz Pentium® microprocessor (available from Intel Corporation), with a microsoft windows NT® operating system, 256 megabytes of RAM, and having approximately 3 gigabytes of permanent storage memory is utilized. The steps of the method of the present invention in this embodiment are implemented in Visual basic™, and C™ computer software. As will be appreciated, the logic for implementing the steps of the present invention may be implemented using any one of a number of known programming and processing techniques or strategies, and is not limited to the order or sequence illustrated herein for convenience. Additionally, parallel processing or multi-tasking systems and methods may be used to accomplish the objects, features, and advantages of the present invention. The present invention is independent of the particular programming language, operating system, or processor used to implement the control logic illustrated herein.

In summary, the method of the present invention is advantageous in that it allows the collection and construction of three-dimensional images from interferometric data without the use of adjunct optical systems for precise wavelength measurement and that this can be accomplished without matching the pathlengths of the object and reference beams. The present invention also corrects for phase errors caused by mechanical drift. In addition, the present invention can correct for phase errors introduced by differences in material dispersion properties caused by differences in the number and type of optical components in the object and reference beams.

While the form of the invention herein shown and described constitutes the preferred embodiment of the invention, it is not intended to illustrate all possible forms thereof. It will be understood the words used are descriptive rather than limiting, and that various changes may be made without departing from the spirit and scope of the disclosed invention.

What is claimed is:

1. In a method of forming an image of an object utilizing multiple wavelength interferometry, a method for determining the range dimension of the object, the method comprising:

developing a two-dimensional representation of the image of the object from an interference pattern for each of a plurality of wavelengths at each of a plurality of selected points on the object;

developing a complex value from the two-dimensional representation of the image for each of the plurality of wavelengths at each of the plurality of selected points on the object;

performing a one-dimensional Fourier transform on a series of the complex values for each of the selected points to yield a range profile for each selected point; and determining a peak value for each of the range profiles to determine the range dimension of the object.

2. The method of claim 1 wherein the peak value is determined by:

locating a likely peak on the range profile;

oversampling the one-dimensional Fourier transform in an area proximate to the likely peak; and locating a peak value from the range profile of the area.

3. The method of claim 1 wherein the peak value is determined by:

locating a likely peak on the range profile;

curve-fitting the range profile near the likely peak; and determining a peak value based on the curve-fitting.

4. The method of claim 1 further including constructing a three-dimensional image of the object at the selected points based upon the peak value for each of the range profiles.

5. The method of claim 1 further comprising applying a phase correction vector to the complex value prior to performing the one-dimensional Fourier transform.

6. The method of claim 5 wherein applying a phase correction vector comprises:

selecting at least one reference point on the object;

determining a difference between each measured phase value and an associated ideal phase value for each of the wavelengths at the at least one reference point;

establishing a phase correction vector from the differences;

establishing corresponding corrected values for points associated with the at least one reference point by adding the phase correction vector to the complex value of each point; and replacing the complex value with the corresponding corrected value for each of the points associated with the reference point.

7. The method of claim 6 wherein the step of selecting at least one reference point comprises:

selecting a temporary reference point;

defining a neighborhood of points surrounding and including the temporary reference point;

comparing data from selected wavelengths for each point in the neighborhood to determine the point having superior phase information data; and replacing the temporary reference point with the point having superior phase information based on the step of comparing.

8. The method of claim 7 wherein the neighborhood comprises nine pixels.

9. The method of claim 6 wherein the points associated with a reference point form a subset of the selected points.

10. The method of claim 6 wherein at least two reference points are selected.

11. The method of claim 5 wherein the phase correction vector is a complex conjugate of the difference between each measured phase value and the associated ideal phase value for each of the wavelengths at the at least one reference point.

12. The method of claim 1 wherein the two-dimensional representation of the object is a discernible two-dimensional image obtained by utilizing a lens to perform a two-dimensional transform of the interference pattern while focusing the interference pattern on a two-dimensional detector array which is positioned in the image plane of the lens.

* * * * *